(No Model.)

J. R. THOMPSON.
HARVESTER.

No. 418,091. Patented Dec. 24, 1889.

Witnesses:
E. P. Ellis,
J. M. Nesbit

Inventor:
Jno. R. Thompson,
per J. A. Lehmann,
atty.

UNITED STATES PATENT OFFICE.

JOHN R. THOMPSON, OF ST. CHARLES, MINNESOTA.

HARVESTER.

SPECIFICATION forming part of Letters Patent No. 418,091, dated December 24, 1889.

Application filed May 29, 1889. Serial No. 312,500. (No model.)

*To all whom it may concern:*

Be it known that I, JOHN R. THOMPSON, of St. Charles, in the county of Winona and State of Minnesota, have invented certain new and useful Improvements in Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in bundle-carriers for harvesters; and it consists in the combination of suitable supports which extend from the harvester-frame, a shaft journaled in the outer ends of the supports, the bundle-carrier rigidly secured to this shaft, an operating-lever placed loosely upon the end of the shaft, a rod for connecting the lever to the carrier, a connecting-rod, and an operating-lever, all of which will be more fully described hereinafter.

The object of my invention is to provide a bundle-carrier for harvesters which is made adjustable in its movements by means of a lever which is loosely placed upon the bundle-carrier shaft.

Figure 1:
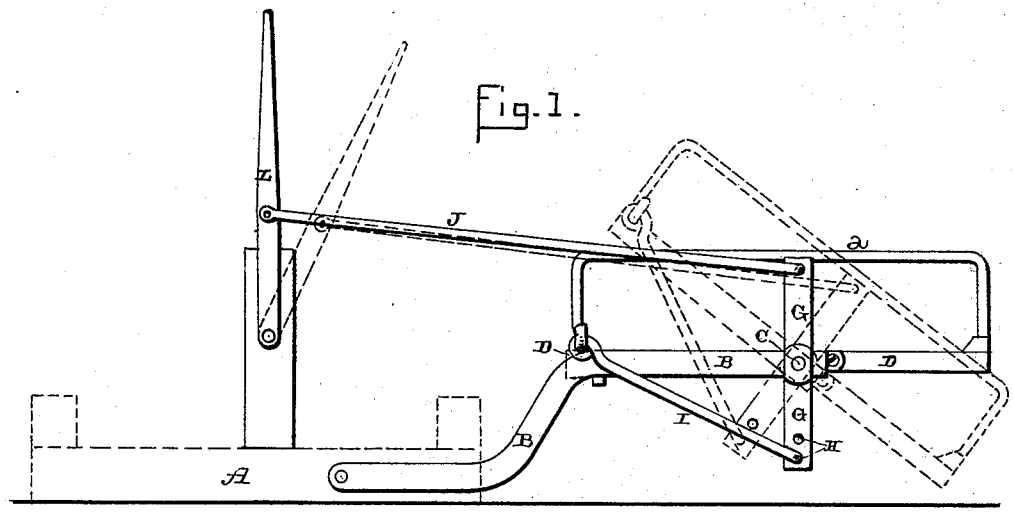
Figure 2:
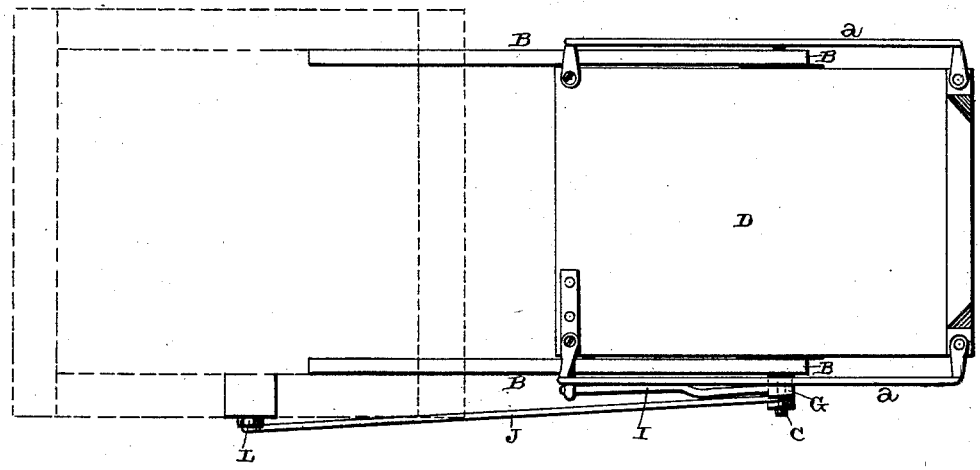

Figure 1 is a side elevation of a bundle-carrier which embodies my invention. Fig. 2 is a plan view of the same.

A represents a harvester-frame of any desired construction, and B suitable metallic supports which project therefrom, as shown. Journaled in the outer ends of these supports B is the shaft C, to which the bundle-carrier D is rigidly secured. Upon the end of the shaft C, which projects through one of the supports B, is placed a lever G, which stands at about a right angle to the bundle-carrier, and through the lower end of this lever are made a series of openings H, in one of which the lower outer end of the connecting-rod I is made to catch. The upper end of this connecting-rod I is loosely fastened to the inner end of the bundle-carrier. By means of the connecting-rod the lever and the bundle-carrier are connected rigidly together, so that when the upper end of the lever is moved by means of the connecting-rod J and the hand-lever L, pivoted upon the frame A, the bundle-carrier can be tilted into the position shown in dotted lines, for the purpose of discharging the bundle and then be returned to position. By changing the lower end of the rod I from one hole to the other in the lower end of the lever the distance the carrier is moved is regulated at the will of the operator.

Whenever a sufficient number of bundles have accumulated upon the carrier, which is provided with side rails *a*, as shown, so as to retain the bundles in position, the operator has only to move the hand-lever L, when the carrier will dump its load.

Having thus described my invention, I claim—

In a bundle-carrier, the combination of the supports, the shaft journaled in their outer ends, the bundle-carrier rigidly secured to the shaft, the lever loosely placed upon the carrier-shaft, a connecting-rod I, for connecting the lever and the carrier together, a connecting-rod connected to the upper end of the lever, and the hand-lever pivoted upon the frame A, substantially as shown and described.

In testimony whereof I affix my signature in presence of two witnesses.

JOHN R. THOMPSON.

Witnesses:
OTTO PFEFFERKORN,
GEORGE PFEFFERKORN.